United States Patent [19]

Franz et al.

[11] 4,297,390

[45] Oct. 27, 1981

[54] PROCESS FOR THE PREPARATION OF A RED EMITTING PHOSPHOR COATED WITH RED IRON OXIDE AND ITS APPLICATION

[75] Inventors: Karl Franz, Barsinghausen; Bernd Schönfeld, Bad Nenndorf, both of Fed. Rep. of Germany

[73] Assignee: Riedel-de Haen Aktiengesellschaft, Seelze, Fed. Rep. of Germany

[21] Appl. No.: 108,638

[22] Filed: Dec. 31, 1979

[30] Foreign Application Priority Data

Jan. 4, 1979 [DE] Fed. Rep. of Germany ....... 2900209

[51] Int. Cl.³ .................... C09K 11/46; C09K 11/477; C09K 11/465; C09K 11/22
[52] U.S. Cl. ........................................ 427/64; 427/68; 427/157; 427/21 S
[58] Field of Search .................... 427/64, 157, 215, 68

[56] References Cited

U.S. PATENT DOCUMENTS

| | | | |
|---|---|---|---|
| 2,959,483 | 11/1960 | Kaplan | 427/68 X |
| 3,114,065 | 12/1963 | Kaplan | 313/472 |
| 3,308,326 | 3/1967 | Kaplan | 427/68 X |
| 3,875,449 | 4/1975 | Byler et al. | 313/468 X |
| 4,020,231 | 4/1977 | Hepler et al. | 427/218 X |

FOREIGN PATENT DOCUMENTS

| | | |
|---|---|---|
| 2702491 | 7/1977 | Fed. Rep. of Germany . |
| 2723495 | 12/1978 | Fed. Rep. of Germany . |
| 2408641 | 6/1979 | France . |
| 7802409 | 9/1979 | Netherlands . |
| 7907195 | 3/1980 | Netherlands . |

OTHER PUBLICATIONS

Patent Abstracts of Japan, vol. 2, Nr. 76 (6/16/78).

*Primary Examiner*—James R. Hoffman
*Attorney, Agent, or Firm*—Curtis, Morris & Safford

[57] ABSTRACT

Filter phosphors consist of phosphor particles coated with a filter material. A phosphor which shows a red emission when excited by cathode rays may be coated with red iron oxide by producing a thin layer of pyrite on the phosphor particles and thereafter converting the said layer into hematite. Thus, the surface of the phosphor particles is evenly coated with a uniform, dense pigment layer of extreme adherence. The filter phosphors thus obtained are used in cathode ray tubes and especially in color picture tubes.

11 Claims, No Drawings

PROCESS FOR THE PREPARATION OF A RED EMITTING PHOSPHOR COATED WITH RED IRON OXIDE AND ITS APPLICATION

The invention relates to a process for the preparation of a red emitting phosphor coated with red iron oxide and to its application in cathode ray tubes, especially colour picture tubes.

Since the basic work of Kaplan (U.S. Pat. Nos. 2,959,483; 3,114,065 and 3,308,326) phosphors together with filter pigments have been used, which on excitation by cathode rays show an emission in the visible part of the spectrum. These filter pigments allow those colours emitted by the phosphors which are intended for use to pass through without a significant loss in original intensity, while largely absorbing the radiation of a different spectral composition. This helps to considerably improve the contrast of cathode ray tubes, especially in colour picture tubes.

This joint use of phosphors and filter pigments has already been considered separately by Kaplan for the three components in colour picture tubes, i.e. the red phosphor with a filter pigment of high red transmission and high absorption for all other colours, the green phosphor with a filter pigment of high green transmission and high absorption for all other colours, and the blue phosphor with a filter pigment of high blue transmission and high absorption for all other colours. This principle has been widely used in colour picture tubes, especially for the red and blue components.

In order to carry this out in practice, separate layers of the individual phosphors where at first applied to television screens. Another method was the preparation of mixtures of the phosphors with the corresponding filter pigments. These were then applied to TV screens (U.S. Pat. No. 3,114,065). With such mixtures, however, the adherence of the filter pigment particles to the phosphor particles is unsatisfactory, resulting in a blending of the different pigments during coating of the TV screens. As a result, the filter effect is changed, and the emission colour is partly altered. In the case of colour picture tubes there is also the risk that separated filter pigment particles might be deposited onto the other two colour components, thus changing the colour coordinates.

Thus, the aim of further development of filter phosphors was to coat the phosphor particles individually with a layer of filter material whereby the maximum possible adherence was an important criterion. This can be achieved, for example, by fixing the filter pigment particles on the surface of the phosphor particles using inorganic or organic binding agents (e.g. U.S. Pat. No. 4,020,231 with silicate and U.S. Pat. No. 3,875,449 with a polyvinyl alcohol resin). It was found that the adherence did indeed increase; however, filter pigment particles were still separated from the phosphors prepared in this manner during the dispersion processes used in tube manufacture. Besides, the additional coating with a binder results in a reduction of electron energy and subsequent reduction of brightness. It is therefore the object of the present invention to coat a red emitting phosphor with red iron oxide. A highly adherent thin coating covering the total surface of the phosphor was to be obtained without the need of a binding agent.

This object is achieved in accordance with the invention by a process in which a thin layer of pyrite is produced in aqueous suspension on a red phosphor, and upon separating the phosphor thus coated from the aqueous phase, the said pyrite is converted into red iron oxide (hematite) by firing at high temperatures.

A coated phosphor is thus prepared in which the surface of the phosphor particles has been evenly coated with a uniform filter pigment layer of pure red iron oxide (hematite) showing an extremely good adherence.

This is even more surprising, as attempts to precipitate iron (II) hydroxide onto the red phosphor and to oxidize the former to give red iron oxide have in most cases only resulted in brown iron (II) oxide.

It is also surprising that in the course of pyrite formation and the subsequent oxidation into hematite, no iron ions migrate into the phosphor crystals. Thus, the brightness is not reduced, even by a killer effect.

Moreover, it is a surprising fact that this process is not only suitable for coating phosphors based on oxides, vanadates and phosphates, but also for those based on oxysulfides. The thermal treatment required for the conversion of pyrite into red iron oxide does not adversely affect the sulfur in the phosphor. This oxidation reaction which is indeed possible and which would lead to a reduction in brightness is probably prevented by the pyrite.

All red emitting phosphors, for example, manganese-activated magnesium fluoroarsenate or fluorogermanate and copper- or silver-activated zinc cadmium sulfide can be coated according to the process described in this invention; similarly oxides, oxysulfides or vanadates of yttrium, lanthanum or gadolinium which have been activated with trivalent europium can be coated.

The most preferred method of coating is to prepare a suspension of a red emitting phosphor in an aqueous polysulfide solution. This is then mixed with a solution containing iron (II) ions and is heated to a temperature of 80° to 100° C., preferably 85° to 95° C., until the black iron(II) sulfide precipitated on the phosphor particles has been converted into grey pyrite, and the phosphor thus coated with pyrite is separated from the aqueous phase, dried and heated in an oxidizing atmosphere to a temperature of more than 250° C., until the pyrite has been converted into red iron oxide (hematite). The heating of the suspension to 80° to 100° C. is preferably carried out with constant agitation, e.g. by stirring.

The thickness of the coating, and thus the brightness and the reflecting power of the coated phosphor, may be controlled by the amount of the iron(II) ions added. Useful results were obtained when 0.35 to 5.0 g of iron-(II) ions per 100 g of phosphor were added.

Under ideal conditions, the thickness of the coating is given by the following equation (I)

$$\frac{M_2}{M_1} = \frac{D_2}{D_1} \cdot \frac{(r+d)^3 - r^3}{r^3} \quad (I)$$

where
$M_1$ = amount of the phosphor to be coated (g)
$M_2$ = amount of the filter pigment coated (g)
$D_1$ = density of the phosphor (g/cm$^3$)
$D_2$ = density of the filter pigment (g/cm$^3$)
r = radius of the phosphor particle ($\mu$m)
d = thickness of the coating ($\mu$m)

When equating $D_1$ to $D_2$ and r to 5 $\mu$m by approximation (the pigments used in colour TV technology usually have a particle diameter of 8 to 20 $\mu$m), an addition of 0.35 g of Fe(II) ions to 100 g of phosphor gives a coating thickness of about 0.007 μm, and an addition of 5 g of Fe(II) ions gives a coating thickness of about 0.1 μm.

Suitable salts yielding iron(II) ions are especially iron(II) sulfate heptahydrate and ammonium iron(II) sulfate.

The order of adding iron(II) ions and polysulfide is not critical. Thus, the phosphor can be suspended in water, and thereafter a solution of iron(II) ions and another solution containing polysulfide may be added.

A suitable polysulfide solution in which the phosphor to be coated is suspended may be an alkali metal polysulfide solution, especially an ammonium polysulfide solution. The concentration of the polysulfide solution is not critical. Suitable are solutions having a content of about 1% by weight of polysulfide. The polysulfide concentration should be sufficient for the precipitation of the iron(II) ions used. A higher excess amount is inappropriate for economical reasons. The amount of suspension liquid used should be such that the suspension can be stirred easily. An amount from 500 to 1000 ml of polysulfide solution per 100 g of phosphor has proven suitable.

When carrying out the process of the invention for preparing a coated phosphor based on an oxysulfides, it is necessary to adjust the suspension to a pH value of less than 8, preferably 6 to 7, by adding an acid. If the precipitation of the iron(II) ions is carried out in a more basic medium having a pH of more than 8, the process results in the formation of basic iron sulfide which on oxidation during thermal treatment is not converted into the required red iron oxide (hematite), but into brown iron oxides. Particularly suitable acids are inorganic acids, e.g. hydrochloric acid and sulfuric acid.

For the coating of pigments based on oxysulfides, special intermediates obtained during the preparation can be used. Thus, the manufacturing process of rare earth metal oxysulfides yields a "cake" which contains excess polysulfide as well as phosphor. The said "cake" may be suspended in water directly after grinding, and after adjusting the pH to a value of less than 8, preferably 6 to 7, iron(II) ions may be added without a further addition of polysulfide, whereupon the product can be processed as described above.

According to the process of the invention, red emitting filter phosphors coated with red iron oxide, having clearly improved properties can be prepared in a very easy way. It is especially advantageous that according to this process the surface of the phosphor crystals is evenly coated with a pigment layer of extremely good adherence. Thus, the difficulties frequently encountered in known coating processes which are due to the separation of filter pigment particles do not occur any longer, and thus the adverse effect on the optical properties of the filter phosphors is likewise prevented.

Another advantage of this process resides in the fact that it leads to a uniform, dense coating of filter pigment around the phosphor particles since it cannot be obtained by applying discrete pigment particles, for example when additionally using binders.

The coated phosphor obtained according to the invention is particularly suitable for use as a filter phosphor in cathode ray tubes, especially in colour picture tubes.

The following examples serve to further illustrate the invention.

EXAMPLE 1

21 Grams of ammonium sulfide solution (40% by weight) and 4 g of sublimated sulfur are stirred into 1000 ml of water. Then 200 g of red phosphor based on yttrium oxide activated with europium(III) are suspended in this solution. A solution of 35 g of iron(II) sulfate-7-hydrate in 50 ml of water is added to the suspension, and the mixture is heated to 90° C. and stirred until the black iron sulfides which initially precipitated onto the luminous pigment have been converted into grey pyrite. The phosphor coated with pyrite is filtered off, washed with distilled water until it is free from ions and is then dried. Subsequently the product is tempered in an oxidizing atmosphere at a temperature of more than 250° C., until the grey pyrite coating has been converted into a red hematite coating. The said coating is in this case 5% by weight of the phosphor.

In the same manner the following red phosphors were coated in separate batches:
(a) Manganese-activated magnesium fluorogermanate
(b) Copper-activated zinc cadmium sulfide
(c) europium(III)-activated yttrium vanadate
(d) europium(III)-activated lanthanum oxide
(e) europium(III)-activated gadolinium oxide.

In all cases phosphors were obtained with a very highly adherent layer of red iron oxide.

EXAMPLE 2

200 Grams of red phosphor based on yttrium-europium oxide with a particle size of 8 to 12 μm are suspended in 1000 ml of water, and 35 g of iron(II) sulfate-7-hydrate, 21 g of 40% ammonium sulfide solution and 4 g of sublimated sulfur are successively stirred in. The suspension is then heated at 90° C. until the black iron sulfide which initially precipitated onto the phosphor is converted into grey pyrite. The luminous substance coated with pyrite is filtered off, washed with distilled water until it is free from ions and is then dried. Subsequently the product is tempered in an oxidizing atmosphere at a temperature of more than 250° C., until the grey pyrite coating has been converted into a red hematite coating. In this case the coating is 5% by weight of the phosphor.

EXAMPLE 3

17.5 Grams of iron(II) sulfate-7-hydrate are added to 2000 g of a suspension, formed by the wet grinding to a particle size of 10 to 15 μm of a "cake" obtained during the manufacture of a red emitting phosphor based on yttrium-europium oxysulfides. This suspension contains about 10% by weight of phosphor and excess sodium polysulfide.

After this the mixture is heated. During this process the pH value of the suspension is maintained at 6.5 to 7.0 by adding hydrochloric acid. After the iron sulfide precipitated at first onto the phosphor has been converted into pyrite, the luminous substance is washed, dried and then tempered at more than 250° C., as described in Example 1. The coating is in this case 2.5% by weight of the phosphor.

What is claimed is:
1. A method for the preparation of a red emitting phosphor coated with red iron oxide which comprises mixing an aqueous suspension of red emitting phosphor with a polysulfide solution and a solution containing iron (II) ions to form a mixture containing said phosphor with a coating of black iron sulfide precipitate, heating the mixture to a temperature in the range of 80° C. to 100° C. to form a grey pyrite coating on the phosphor, separating the grey pyrite coated phosphor from the aqueous phase of the mixture and heating and drying said coated phosphor at a temperature in excess of 250° C. in an oxidizing atmosphere to form a red iron oxide coating on said phosphor.

2. The method of claim 1 wherein the red emitting phosphor is selected from the group consisting of oxides, oxysulfides or vanadates of ytrrium, lanthanum and gadolinium activated with trivalent europium.

3. The method of claim 1 wherein 0.35 to 5.0 g of iron (II) ions are added per 100 g of phosphor.

4. The method of claim 1 wherein 500 to 1000 g of said polysulfide solution containing about 1% by weight of polysulfide is added per 100 g of phosphor.

5. The method of claim 1 wherein said polysulfide solution is an ammonium polysulfide solution.

6. The method of claim 1 wherein the red emitting phosphor is an oxysulfide of europium-activated ytrium, lanthanum or gadolinium in which the aqueous suspension is adjusted to a pH of less than 8 by addition of an acid prior to mixing with the solution containing iron (II) ions.

7. The method of claim 6 wherein the pH is adjusted in the range of from 6 to 7.

8. The method of claim 1 wherein the red emitting phosphor is an oxysulfide of europium-activated ytrium, lanthanum or gadolinium in which an intermediate obtained during preparation of said phosphor containing excess polysulfide is suspended in water and adjusted to a pH of less than 8 by addition of an acid, prior to the addition of iron (II) ions.

9. The method of claim 8 wherein said suspension is adjusted to a pH in the range of from 6 to 7.

10. The method of claim 1 which further comprises applying said red emitting phosphor coated with red iron oxide to a cathode ray tube.

11. The method of claim 10 wherein said cathode ray tube is a color cathode ray tube.

* * * * *